Sept. 11, 1934. C. H. BARTON 1,972,915
SPRING CLUTCH
Filed Oct. 12, 1931 2 Sheets-Sheet 2
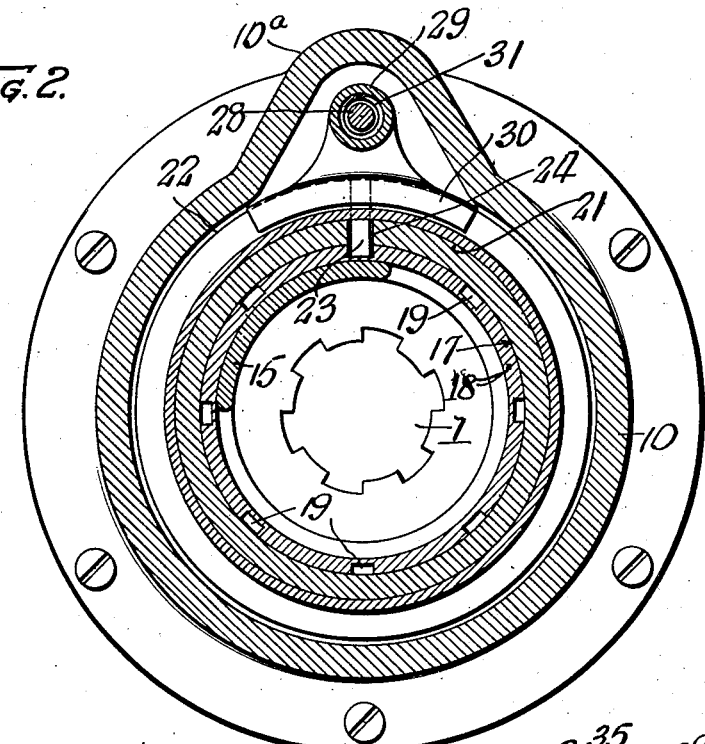
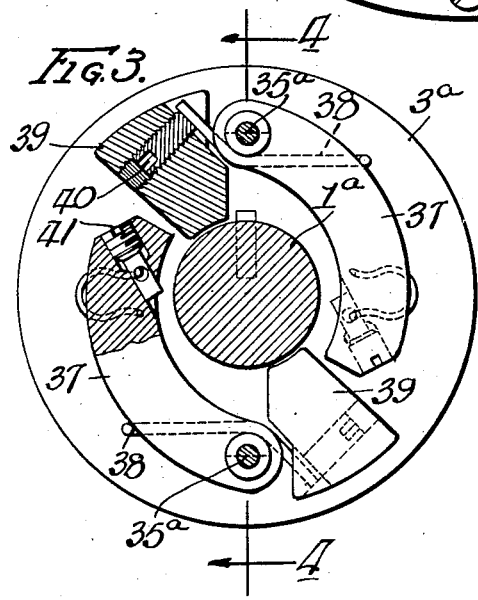
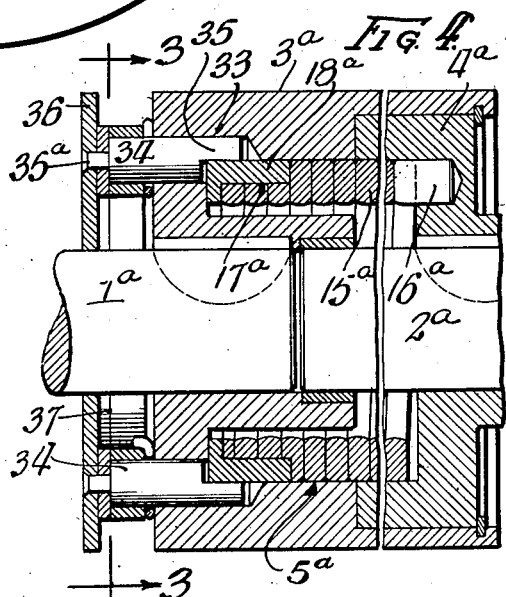
Inventor:
Clarence H. Barton,
By: Arthur Wm Nelson
Atty.

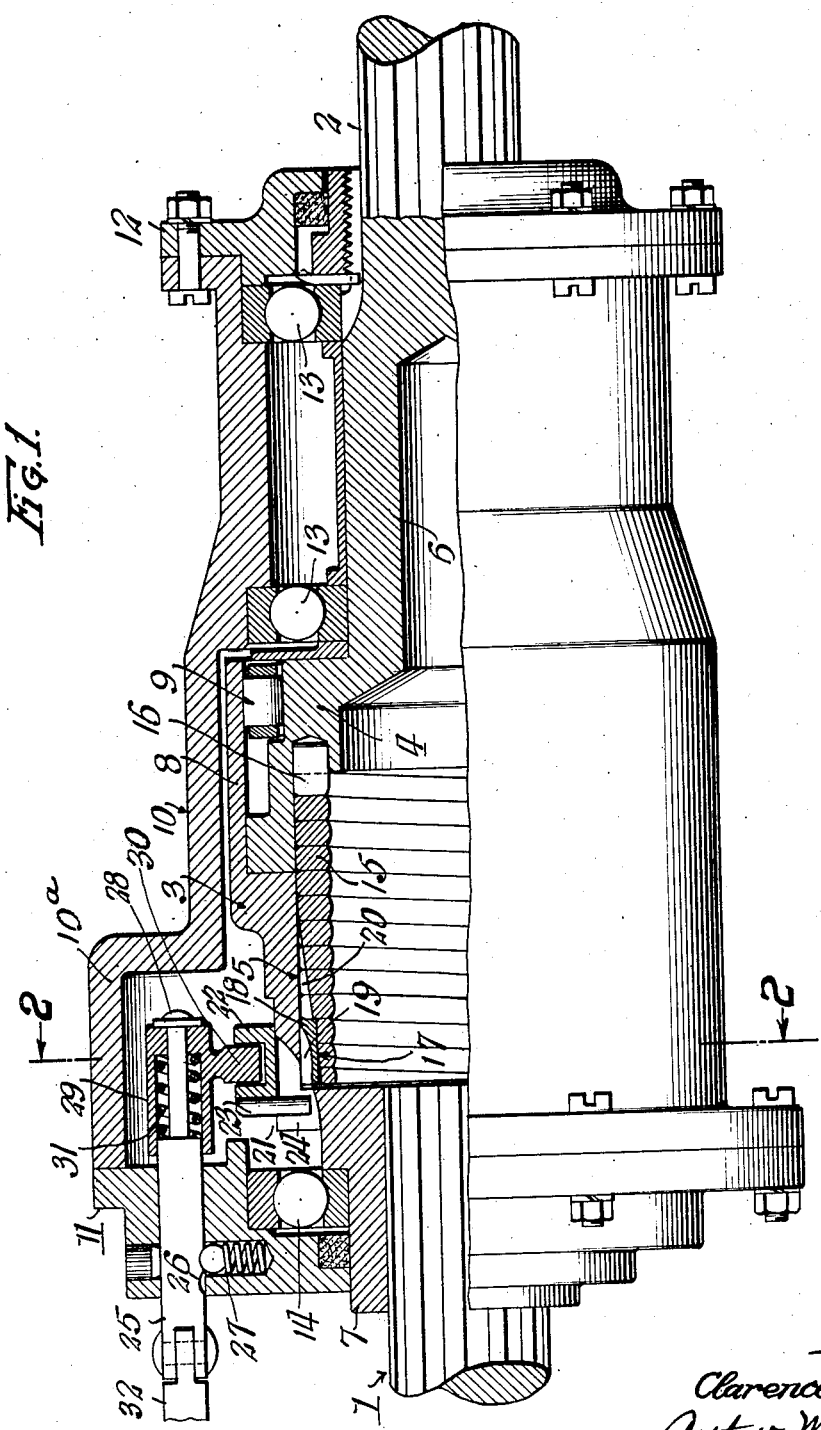

Patented Sept. 11, 1934

1,972,915

UNITED STATES PATENT OFFICE 1,972,915

SPRING CLUTCH

Clarence H. Barton, Indianapolis, Ind., assignor to L. G. S. Devices Corporation, Indianapolis, Ind., a corporation of Indiana Application October 12, 1931, Serial No. 568,303

7 Claims. (Cl. 192—35)

This invention relates to improvements in spring clutches and it consists of the matters hereinafter described and more particularly pointed out in the appended claims.

The spring clutches with which my invention is more particularly concerned are of the type embodying therein two relatively rotatable members and a clutch spring associated therewith and normally free from connection with one of said members, said members having surfaces arranged to be gripped by said spring upon a change in its diameter produced in response to relative rotation of said members in one direction, a relative rotation between said members in the other direction serving to produce an overrunning action and thereby setting up an undesirable stress in certain members in the clutch.

The primary object of the invention is to provide a simple and improved means for energizing one end of the spring in a clutch of this kind and which spring is preferably undersize with respect to its associated pocket in the clutch members and said improved means of energizing the end of the spring is aimed to permit of the overrunning of the clutch and not produce undesirable stresses while still subject to the energizing means.

Another object of the invention is to provide a structure of this kind wherein one end of the spring is turned down to provide a seat for a frictional connection with an energizing collar which may be manually locked to one of the clutch members whereby said turned down end of the spring may be operatively connected to said clutch member in a manner causing the spring to change its diameter and clutch said members together and in such manner as to permit of the spring overrunning the energizing collar while said collar is still locked to said clutch member.

The above mentioned objects of the invention as well as others, together with the many advantages and characteristics of the present overrunning clutch construction will more fully appear as I proceed with my specification.

In the drawings:—

Fig. 1 is a view partly in side elevation and partly in longitudinal section of a spring clutch embodying one form of the invention.

Fig. 2 is a transverse vertical sectional view through the same as taken on the line 2—2 of Fig. 1.

Fig. 3 is a transverse vertical sectional view through a modified form of spring clutch embodying my invention as taken on the line 3—3 of Fig. 4.

Fig. 4 is a longitudinal vertical section through the clutch construction shown in Fig. 3 as taken on the line 4—4 of said Fig. 3.

In general, my improved spring clutch comprises two coaxially disposed clutch members having recesses that coact to provide a clutch spring receiving pocket. In said pocket is a clutch spring having a slight clearance with respect to the annular wall or surface of the pocket and this spring has an anchored toe engagement at one end with one of the clutch members.

The other end of said spring is turned down externally in diameter to provide a supporting seat for a collar having a snug fit thereon and having a slight clearance with respect to the said annular wall or surface before mentioned. Thus the spring and collar act as a unit normally having a free overrunning action with respect to the said clutch members.

The collar before mentioned is so formed that it may be arrested by certain means provided therefor so that in the relative rotation between the clutch members in one direction, said end of the spring is energized and such energization progresses throughout the entire spring which radially expands to grip against the annular wall or surface of the pocket and thus clutch said members together. The means of arresting the collar as before mentioned, may be either a manually operable or an automatic one, according to the use to which the clutch is to be put.

Referring now in detail to that embodiment of the invention illustrated in the drawings and especially to Figs. 1 and 2 thereof:—1 indicates a driving shaft and 2 indicates the coaxial driven shaft which may carry any suitable pulley gear or coupling for the transmission of power.

Secured to the adjacent ends of said shafts are abutting cup-like clutch members 3 and 4 which have coacting recesses forming a clutch spring pocket 5.

As shown in this particular instance, the clutch member 4 has a relatively long hub 6 which connects it to its associated shaft 2 while the clutch member 3 has a relatively short hub 7 at one end for engagement with the shaft 1 and an annular flange 8 at its other end that overhangs a part of the clutch member 4. An annular antifriction bearing 9 is disposed between said flange and part of the clutch member 4 which it overhangs to provide a mutual supporting connection between the two clutch members.

Preferably the clutch is enclosed by a non-rotative or stationary housing comprising a casing 10 and associated removable end covers or closures 11 and 12 respectively. At that end of said casing associated with the end cover or closure 11 is a hollow boss 10a the purpose of which will soon appear. Between one end of said casing and the hub 6 of the clutch member 4 are provided longitudinally spaced, antifriction bearings 13 and between the end cover or enclosure 11 and the hub 7 of the clutch member 3 is another antifriction bearing 14. With such an arrangement, it is apparent that both the driving and driven shafts can run free with respect to the housing which as before mentioned, is a stationary one.

In the pocket 5 as provided by the recesses of the clutch members 3 and 4 is located a clutching element in the form of a coil spring 15. This spring is of such an external diameter that when in its normal unstressed condition, it will have but a slight clearance with respect to the annular wall or surface of said pocket. One end of said spring and preferably that end associated with the clutch member 4 is toed as at 16 for an operative connection with said clutch member.

A few of the coils or turns of the spring at the other end of said spring are turned down externally to provide a part 17 of reduced diameter and seated thereon is an energizing ring 18. Said ring has an external diameter substantially the same as that of the remaining portion of the spring and has an internal diameter slightly less than the external diameter of the part 17, so that the coils turned down to provide said part act as an auxiliary spring having a constant and snug engagement with said ring. In the external surface of said ring is a plurality of arcuately spaced, longitudinally extending grooves 19 that are open through that end only of the ring facing away from the main body portion of the spring. Preferably but not necessarily so said spring is provided in its periphery with a plurality of longitudinally extending, tapering grooves 20 that open into said part 17 of reduced diameter. These grooves permit of a progressive energizing of the spring from the associated end and therefore make the action of the same much better in its use for its intended purpose.

When the spring is in its normal unstressed condition wherein it, together with its associated ring is out of engagement with the annular wall of the recess, it is apparent that the clutch members are free to rotate relatively in either direction. Therefore, before the spring becomes operative to clutch the two clutch members together, the normally free end of the spring must be manually or otherwise caused to so engage its associated clutch member as to turn relatively to its other end (which is anchored to its associated clutch member) so that the spring in such relative rotation radially expands and clutches the two clutch members together.

In Figs. 1 and 2 a manually operable means is provided for this purpose and such means is as follows:—Midway between its ends, the clutch member 3 is turned down to provide an annular seat 21 for an externally grooved shiftable collar 22. This collar carries a pin 23 at one end for engagement in a longitudinal recess 24 formed in said turned down part of the clutch member and this recess opens into the interior of the clutch pocket 5.

Mounted for longitudinal movement in the cover 11 of the housing so as to extend into the hollow boss 10a thereof is an actuator rod 25 formed in one side with spaced recesses 26 engageable by a spring pressed detent 27 in the form of a ball. That end of the rod 25 extending into the boss 10a is reduced in diameter to provide a stem 28 upon which is mounted the hub 29 of a yoke 30 engaged in the groove of the shifter collar 22. A spring 31 surrounds the stem 28 between the end of the rod 25 and the end of the yoke hub 29. The other end of the rod 25 outside the cover or closure 11 is operatively connected in any suitable manner to an actuating member 32.

Assume that the drive shaft 1 is in operation and the parts are in the relative positions shown in Fig. 1 and that the clutch member 3 is being driven by said shaft. Under such conditions, the shaft 2 is passive as is the clutch member 4 because with the spring 15 in its normal unstressed condition, said spring and its ring are out of engagement with the annular wall of the clutch spring pocket. It is also apparent that because of the engagement of the pin 23 in the recess 24 the collar 22 is rotating with the clutch member 3.

Assume now that it is desired to connect operatively the shaft 2 to the shaft 1 so that the former is driven by the latter. By an endwise inward movement of the rod 25 the spring 31 is compressed until it picks up the yoke 30 to move the same toward the clutch member 4. In this movement of said yoke, the collar 22 is moved therewith and the pin 23 thereon is brought up against the end of the collar 18 and so soon as one of the notches 19 therein lines up with the recess 24, the pin 23 snaps into said notch and the parts will be releasably held in this position by the engagement of the spring pressed detent 27 in that recess 26 toward the outer end of the rod 25. When said pin 23 has snapped into said notch, this will cause the ring 18 to turn with the clutch member and as said ring has a snug fit on the part 17 of the spring 15, said part turns with the ring and tends to unwind the spring 15, it being borne in mind that the other end of the spring is toed to the clutch member 4 which at this time is passive. As said spring unwinds it tends to expand radially and then clutch said clutch members together and thus drive the shaft 2. To release the clutch the rod 25 is moved outwardly, and this movement is transmitted to the collar 22 through the yoke so that the pin 23 is withdrawn from engagement in the notch 19 in the ring 18, the rod 25 being held in this position by the engagement of the detent 27 in the other recess 26 in said rod.

When the ring 18 is locked to the clutch member 3 by the pin 23, should the shaft 2 for any reason tend to rotate faster than the shaft 1 the spring 15 is wound up from its toed end 16 and is progressively contracted toward its collar end and releases its gripping action on the surface of the pocket 5 and on the interior of the ring 18 so that the shaft 2 slips with respect to the clutch member 3 and the ring 18 and overruns the shaft 1.

In Figs. 3 and 4, I have illustrated the invention as applied to an unloading coupling wherein when the drive shaft has attained the desired speed, it automatically actuates certain means to clutch an associated driven shaft thereto and should the load on the driven shaft be so great as to retard the drive shaft, then at a predetermined speed the gripping action of the spring is released. When the speed of the drive shaft again picks up it again is automatically clutched to the driven shaft.

In Fig. 4, the drive shaft is indicated at 1a, and 2a indicates the driven shaft. On said shafts are secured the clutch members 3a and 4a respectively which coact to provide the clutch spring pocket 5a. In said recess is the clutch spring 15a one end of which is toed as at 16a to the clutch member 4a and the other end of which is turned down to provide the seat 17a for the energizing ring 18a which is devoid of any notches 19 as in the case of the ring shown in Fig. 1.

The clutch member 3a is provided at that end opposite the clutch member 4a, with diametrically oppositely arranged, longitudinally, extending openings 33 the axes of which are spaced apart a distance approximating the diameter of the clutch spring pocket 5a. In each opening 33 is a short shaft element 34 and the inner end 35 of each element is made semicylindrical so as to overhang the ring 18a. The outer end of each shaft element is formed to provide a stem 35a to which is secured a ring 36.

Fixed to each shaft element 34 between the clutch member 3a and the ring 36 is a governor weight or arm 37, and a spring 38 is operatively engaged with the associated arm end and with a block 39 carried by the ring. These springs normally tend to urge the free end of the arms 37 in toward the shaft 1a. A screw plug 40 is carried by each block whereby the tension of the spring 38 may be adjusted and the outer end of each arm carries a screw 41 whereby the action of said arms may be equalized. By such means as above described, the arms 37 can also be so regulated that they can be caused to move outward at a certain R. P. M. and not return inward until a lower R. P. M. and to impart a snap action to the arms causing them to snap in or out rather than move sluggishly.

Assume now that the shaft 1a is driving the clutch member 3a. When a predetermined speed has been attained the arms 37 move outward centrifugally thus turning the associated shaft elements 34. In this turning of said elements, their ends 35 will grip the ring 18a and connect the same to the clutch member 3a, when the drag action of said ring will cause an expanding of the spring 15a to clutch the two clutch members together.

During the drive of this driven shaft should it attain a speed greater than that of the drive shaft, it will overrun said drive shaft. Should the load of the driven shaft be so great as to retard the speed of the drive shaft through overload, then at a predetermined speed which is at some point less than the opening speed of the weight arms 37, said arms will return to their inner positions, thus releasing the grip on the clutch member. This will result in a dropping of the load and will permit the drive shaft to jump into speed and again pick up said load.

It is apparent from the above that in both instances, the energizing ring when operatively connected to its associated clutch member, either manually or automatically, will cause the spring to operatively engage and clutch the two clutch members together and in a manner permitting an overrun of the driven shaft with respect to the drive shaft as before described.

With such an arrangement, the undersize clutching spring which eliminates drag is instantaneously energized to connect the two clutch members together. Thus a simple and efficient structure is provided which will not run hot and which will have a long period of usefulness.

While in describing the invention, I have referred in detail to the form, arrangement and construction of the various parts thereof, the same is to be considered merely as illustrative so that I do not wish to be limited thereto except as may be specifically set forth in the appended claims.

I claim as my invention:—

1. A spring clutch embodying therein two relatively rotatable clutch members coacting to provide a clutch spring pocket having an internal gripping surface, a coil spring in said pocket having one end turned down to decrease its diameter and having its other end operatively connected to one of said clutch members, an energizing member surrounding said turned down end of the spring and rotative therewith and means operative to connect said energizing member to the other clutch member to energize said spring and increase its diameter so as to grip said surface.

2. A spring clutch embodying therein two relatively rotatable clutch members coacting to provide a clutch spring pocket having an internal gripping surface, a coil spring in said pocket having a normal diameter providing a clearance between it and said surface, said spring having one end reduced in diameter and having its other end operatively connected to one of said clutch members, a ring having an external diameter approximating that of the spring and engaged upon the reduced end thereof so as to rotate therewith and means operable to connect said ring to the other clutch member to energize the spring and increase its diameter so as to grip said surface.

3. A spring clutch embodying therein two relatively rotatable clutch members, a coil clutch spring associated with said members and operatively engaged at one end with one of said clutch members, an energizing ring surrounding a plurality of coils at the other end of the spring and frictionally engaging said coils so as normally to turn therewith in response to relative movement between said clutch members in one direction, and means operable to connect said energizing ring to the other one of said clutch members, said energizing ring when so connected to said other clutch member operating in response to relative rotation between said clutch members in the other direction to hold the associated end of the spring upon which it is frictionally engaged and cause said spring to change its diameter and grip against said other one of said clutch members.

4. A spring clutch embodying therein two relatively rotatable clutch members, a clutch spring associated with said members and operatively engaged at one end with one of said clutch members, the other end of said spring being reduced in external diameter to provide an annular seat, an energizing member frictionally engaged upon said seat so as to turn normally therewith in response to relative movement between said clutch members in one direction, and means operable to connect said energizing member to the other one of said clutch members, said energizing member when so connected to said other clutch member operating in response to relative rotation between said clutch members in the other direction to hold the associated end of the spring and cause said spring to change its diameter to grip against said other one of said clutch members.

5. A spring clutch embodying therein two relatively rotatable clutch members coacting to provide a clutch spring pocket, a coil spring in said pocket having one of its ends formed to provide an annular seat and having its other end connected to one of said clutch members, an energizing member engaged upon said seat and normally rotative with said spring and means operable to connect said energizing member to the other clutch member to energize said spring in response to relative rotation of said clutch members in one direction and cause the same to change its diameter so as to grip against said other clutch member.

6. A spring clutch embodying therein two relatively rotatable clutch members coacting to provide a clutch spring pocket, a coil spring in said pocket having one of its ends formed to provide an annular seat and having its other end connected to one of said clutch members, that portion of the spring beginning at said seat and extending toward the other end of said spring being formed to increase its resiliency, an energizing member engaged upon said seat and normally rotative with said spring and means operable to connect said energizing member to the other clutch member to energize the spring in response to relative rotation of said clutch members in one direction so as to grip against said other clutch member.

7. In combination with a driving clutch member, a driven clutch member, a coil clutch spring positioned between said members and having one end operatively connected to the driven clutch member and having certain of the coils at its other end shaped to provide an annular seat, an energizing ring engaged with said seat and normally rotative with said one end of the spring when the driven clutch member is running faster than the driving clutch member, and means operable to connect said energizing member to the driving clutch member, said energizing member when so connected to the driving clutch member and when the driving clutch member is rotating faster than the driven clutch member, operating to cause said spring to change its diameter and grip upon said driving clutch member.

CLARENCE H. BARTON.